United States Patent
Chang et al.

(10) Patent No.: US 11,287,897 B2
(45) Date of Patent: *Mar. 29, 2022

(54) MOTION DETECTING SYSTEM HAVING MULTIPLE SENSORS

(71) Applicant: PixArt Imaging Inc., Hsin-Chu County (TW)

(72) Inventors: Ting-Yang Chang, Hsin-Chu County (TW); Yen-Min Chang, Hsin-Chu County (TW); Nien-Tse Chen, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 35 days.

This patent is subject to a terminal disclaimer.

(21) Appl. No.: 16/903,863

(22) Filed: Jun. 17, 2020

(65) Prior Publication Data

US 2020/0310551 A1    Oct. 1, 2020

Related U.S. Application Data

(63) Continuation of application No. 16/194,551, filed on Nov. 19, 2018, now Pat. No. 10,725,554, which is a continuation of application No. 14/933,327, filed on Nov. 5, 2015, now Pat. No. 10,248,217, which is a continuation-in-part of application No. 14/097,442, filed on Dec. 5, 2013, now Pat. No. 10,747,326.

(30) Foreign Application Priority Data

Dec. 14, 2012  (TW) ................... 101147554

(51) Int. Cl.
   *G06F 3/01*    (2006.01)
   *G06K 9/00*    (2006.01)
   *H04N 5/247*   (2006.01)

(52) U.S. Cl.
   CPC ......... *G06F 3/017* (2013.01); *G06K 9/00355* (2013.01); *H04N 5/247* (2013.01)

(58) Field of Classification Search
   CPC .... G06F 3/017; G06K 9/00355; H04N 5/247; H04N 5/04; H04N 5/2258; H04N 5/232411
   USPC .................................................. 345/156–169
   See application file for complete search history.

(56) References Cited

U.S. PATENT DOCUMENTS

| | | | |
|---|---|---|---|
| 7,850,526 B2 | 12/2010 | Zalewski et al. | |
| 8,743,052 B1 * | 6/2014 | Keller | G06F 3/014 345/156 |
| 10,248,217 B2 * | 4/2019 | Chang | H04N 5/247 |
| 10,725,554 B2 * | 7/2020 | Chang | G06F 3/017 |
| 10,747,326 B2 * | 8/2020 | Huang | G06F 3/017 |
| 2006/0187196 A1 * | 8/2006 | Underkoffler | G06K 9/00375 345/156 |
| 2008/0192004 A1 * | 8/2008 | Lapstun | G06K 7/10722 345/156 |

(Continued)

*Primary Examiner* — Kwin Xie
(74) *Attorney, Agent, or Firm* — WPAT, PC

(57) ABSTRACT

The present invention provides a motion detecting system, which includes a light source module, a plurality of image sensors and a control unit. The light source module illuminates at least one object. The image sensors respectively detect the object under the light emitted by the light source module to generate a plurality of detection results. The control unit is coupled to the image sensors, and generates a control command according to the detection results.

14 Claims, 19 Drawing Sheets

1600

(56) References Cited

U.S. PATENT DOCUMENTS

| | | | |
|---|---|---|---|
| 2010/0315335 A1 | 12/2010 | Villar et al. | |
| 2012/0119985 A1* | 5/2012 | Kang | G06F 3/0304 |
| | | | 345/156 |
| 2013/0328763 A1 | 12/2013 | Latta et al. | |
| 2014/0160021 A1* | 6/2014 | Lee | G06F 3/03543 |
| | | | 345/158 |
| 2014/0240231 A1* | 8/2014 | Minnen | G06K 9/00201 |
| | | | 345/158 |
| 2014/0306877 A1* | 10/2014 | Katz | G06F 3/017 |
| | | | 345/156 |

* cited by examiner

MOTION DETECTING SYSTEM HAVING MULTIPLE SENSORS

CROSS REFERENCE TO RELATED APPLICATION

The present application is a continuation application of U.S. Ser. No. 16/194,551, filed on Nov. 19, 2018, which is a continuation application of U.S. Ser. No. 14/933,327, filed on Nov. 5, 2015, which is a continuation-in-part application of U.S. Ser. No. 14/097,442, filed on Dec. 5, 2013, which is based on and claims priority to Taiwanese Application Number 101147554, filed Dec. 14, 2012 and Taiwanese Application Number 102140448, filed Nov. 7, 2013, the disclosures of which are hereby incorporated by reference herein in their entirety.

BACKGROUND

1. Field of the Disclosure

The present invention relates to motion detection, and more particularly, to a motion detecting system having a plurality of image sensors.

2. Description of the Related Art

Today, motion detection technology is widely applied to field of human-machine interface, where a new one is gesture sensing technique. The gesture sensing system can determine a user's requirement or instruction by sensing the user's hand motion or state, and then generates electrical signals to control the system.

Generally, a conventional gesture sensing system includes a light source and an image sensor. The light source generates light to the user's hand, and the image sensor captures/senses reflected light of the hand. However, because the lens of the image sensor has a limited view angle, the image sensor cannot capture the hand motion or state outside a specific range, causing the gesture sensing system having a limited sensing range.

SUMMARY

To solve the problem that the gesture sensing system has a limited sensing range, the present invention provides a motion detecting system having a plurality of image sensors, which can increase the effective sensing range of the motion detecting system. In addition, the present invention also provides positioning methods of the image sensors and light source module. By using these positioning methods, the motion detecting system can detect the motion and state of the object more accurately.

The present disclosure provides a motion detecting system including a first gesture sensor, a second gesture sensor, a navigation device and a control unit. The first gesture sensor is configured to sense reflecting light of a first hand to calculate an object motion of the first hand. The second gesture sensor is configured to sense reflecting light of a second hand to generate second image data. The navigation device is configured to calculate a displacement with respect to a surface. The control unit is coupled to the first gesture sensor, the navigation device and the second gesture sensor. The control unit is configured to output a cursor control command for controlling a cursor movement according to the displacement calculated by the navigation device, and control the cursor movement according to the object motion. Dots of the cursor movement per inch object motion of the first hand calculated by the first gesture sensor are larger than dots of the cursor movement per inch displacement calculated by the navigation device. The second image data outputted by the second gesture sensor is not configured to control the cursor movement.

The present disclosure further provides a motion detecting system including a gesture sensor, a mouse device and a control unit. The gesture sensor is configured to sense reflecting light of a hand to calculate an object motion of the hand. The mouse device is configured to calculate a displacement with respect to a surface. The control unit is coupled to the gesture sensor and the mouse device. The control unit is configured to output a cursor control command for controlling a cursor movement according to the displacement calculated by the mouse device, and control the cursor movement according to the object motion. Dots of the cursor movement per inch object motion of the hand calculated by the gesture sensor are larger than dots of the cursor movement per inch displacement calculated by the mouse device.

The present disclosure further provides a motion detecting system including an image sensor, a navigation device and a control unit. The image sensor is configured to sense reflecting light of an object to calculate an object motion of the object. The navigation device is configured to calculate a displacement with respect to a surface. The control unit is coupled to the image sensor and the navigation device. The control unit is configured to output a cursor control command for controlling a cursor movement according to the displacement calculated by the navigation device, and control the cursor movement according to the object motion. Dots of the cursor movement per inch object motion of the object calculated by the image sensor are larger than dots of the cursor movement per inch displacement calculated by the navigation device.

These and other objectives of the present invention will no doubt become obvious to those of ordinary skill in the art after reading the following detailed description of the preferred embodiment that is illustrated in the various figures and drawings

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

Figure 1:
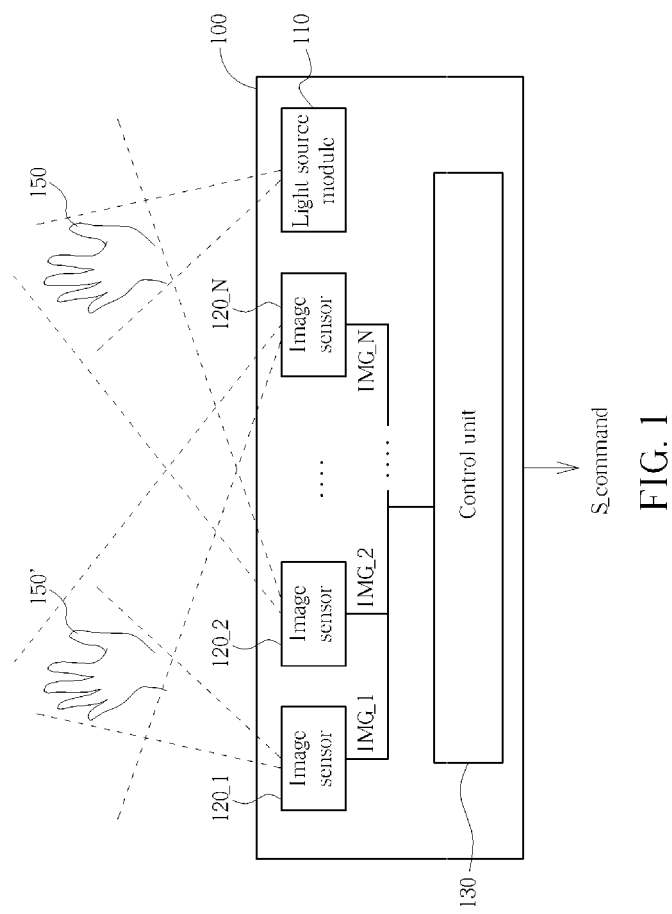
FIG. 1 is a diagram illustrating a motion detecting system according to a first embodiment of the present invention.

FIG. 1 is a diagram illustrating a motion detecting system according to an embodiment of the present invention. As shown in FIG. 1, the motion detecting system 100 includes a light source module 110, a plurality of image sensors 120_1-120_N and a control unit 130. The light source module 110 is used to generate light to an object 150. In this embodiment, the object 150 can be a user's hand, but it's not a limitation of the present invention. In other embodiments, the object 150 can be any other object that can represent different motions and states. The image sensors 120_1-120_N sense the object 150 under the light (i.e. the reflecting light of the object 150) to generate a plurality of different image sensing results IMG_1-IMG_N. The control unit 130 is couple to the image sensors 120_1-120_N, and is used to generate a control command S_command according to the image sensing results IMG_1-IMG_N. Finally, the motion detecting system 100 transmits the control command S_command to a host.

In one embodiment, some control commands may be determined by sensing the motions or states of more than one object (i.e. user's left hand and right hand). In this condition, the motion detecting system 100 needs to perform motion detection upon the objects. At this time, the light source module 110 illuminates the object 150 and the object 150', and the image sensors 120_1 and 120_2 sense the object 150 and the object 150', respectively, to generate two different image sensing results IMG_1 and IMG_2. Then, the control unit 130 generates the control command S_command according to the image sensing results IMG_1 and IMG_2.

Figure 2:
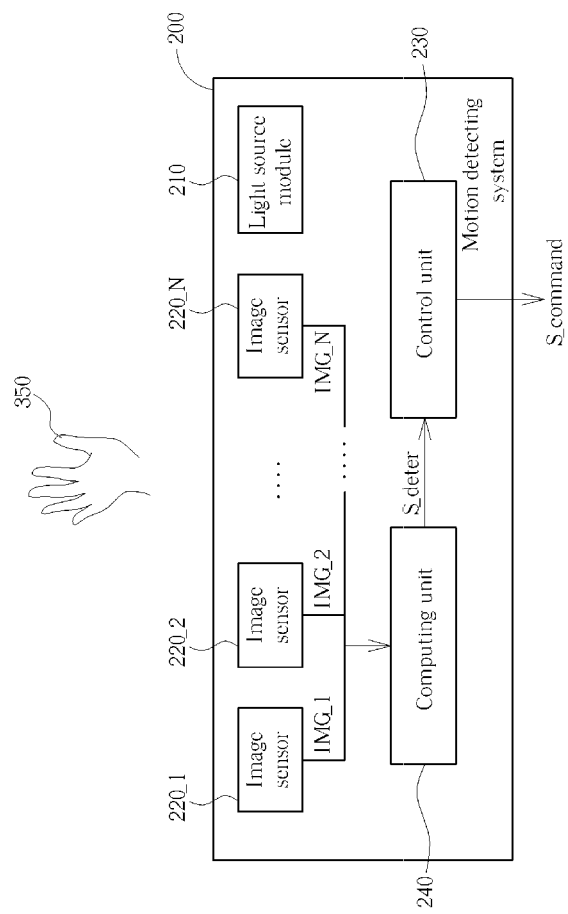
FIG. 2 is a diagram illustrating a motion detecting system according to a second embodiment of the present invention.

In addition, before the control unit generates the control command S_command according to the image sensing results IMG_1-IMG_N, the motion detecting system can use its computing unit to analyze the image sensing results IMG_1-IMG_N. Please refer to FIG. 2, which is a diagram illustrating a motion detecting system according to another embodiment of the present invention. As shown in FIG. 2, the motion detecting system 200 comprises not only a light source module 210, a plurality of image sensors 220_1-220_N and a control unit 230 but also a computing unit 240. The computing unit 240 is coupled between the image sensors 220_1-220_N and the control unit 230, and the computing unit 240 is used to generate a determining result S_deter according to the image sensing results IMG_1-IMG_N, where the determining result S_deter indicates the motion and state of the object 250. Then the computing unit 240 transmits the determining result S_deter to the control unit 230, and the control unit 230 generates the control command S_command according to the determining result S_deter. In addition, operations of the computing unit 240 may include analyzing image contents of the image sensing results IMG_1-IMG_N, and determines a shape and/or a center of the object 250, and/or determines a relative distance, angle and moving direction between the object 250 and the image sensors. For example, when the object 250 is a use's hand, the computing unit 240 can determine what gesture the hand shows. Then the control unit 230 compares the determining result S_deter with predetermined gesture (s), and the control unit 230 generates the control command S_command when the gesture the hand shows now is the same as a predetermined gesture. In some embodiments, the computing unit 240 is, for example, a microprocessor (MCU) and included in the control unit 230 to form the motion detecting system as shown in FIG. 1.

Figure 3:
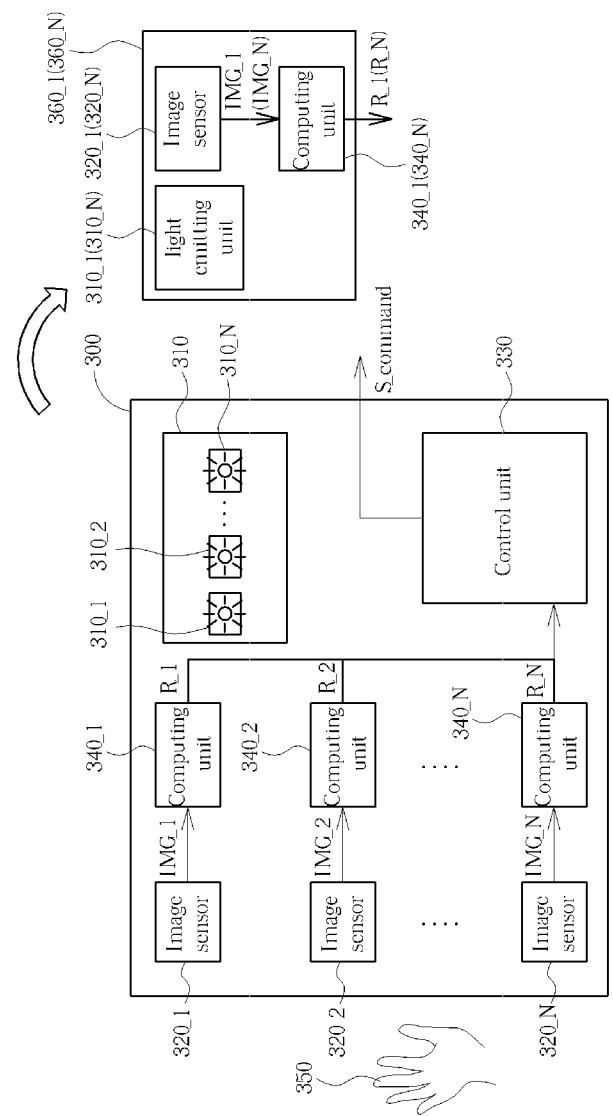
FIG. 3 is a diagram illustrating a motion detecting system according to a third embodiment of the present invention.

In another embodiment, the motion detecting system may include a plurality of computing units, and the computing units analyze image contents of the image sensing results, respectively. Please refer to FIG. 3, the motion detecting system 300 comprises a plurality of computing units 340_1-340_N, where the computing units 340_1-340_N are coupled to the image sensors 320_1-320_N, and the computing units 340_1-340_N respectively receive the image sensing results IMG_1-IMG_N generated from the image sensors 320_1-320_N. Each of the computing units 340_1-340_N may generate a determining result by determining a shape and/or a center of the object 350, and/or by determining a relative distance, angle and moving direction between the object 350 and the image sensors. The control unit 330 receives the determining results R_1-R_N from the computing units 340_1-340_N to generate the control command S_command. In addition, the light source module 310 includes a plurality of light emitting units 310_1-310_N. Practically, the motion detecting system 300 can be regarded as a combination of a plurality of motion detecting sub-systems 360_1-360_N, where each of the motion detecting sub-systems comprises a light emitting unit, an image sensor and a computing unit. In the motion detecting sub-systems 360_1-360_N, the computing units 340_1-340_N are, for example, digital signal processors (DSP). In this case, the determining results R_1-R_N are considered as the image sensing results outputted by the motion detecting sub-systems 360_1-360_N. In some embodiments, said motion detecting sub-systems 360_1-360_N respectively include an image sensor and a computing unit but does not include a light emitting unit. Because each of the motion detecting sub-systems is configured as a conventional gesture sensor, therefore, the motion detecting system 300 can be implemented by the conventional gesture sensors and using the control unit 330 to integrate and analyze the determining results of the computing units of the gesture sensors to obtain the control command S_command.

Figure 4:
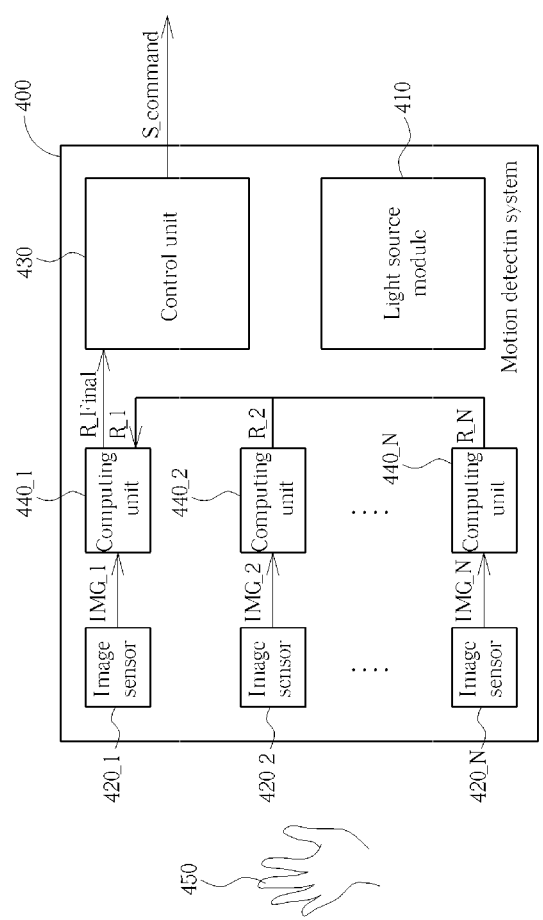
FIG. 4 is a diagram illustrating a motion detecting system according to a fourth embodiment of the present invention.

In another embodiment, the motion detecting system may include a plurality of computing units, but one of the computing units is used as a master. That is, the determining results generated from the other computing units are transmitted to the master first, and after the master analyzes the relationship between the data, the computing unit serving as the master transmits an integrated determining result to the control unit. The detail of the above-mentioned embodiment is shown in FIG. 4. The motion detecting system 400 comprises a plurality of computing units 440_1-440_N, where the computing units 440_1-440_N are coupled to the image sensors 420_1-420_N, and the computing units 440_1-440_N respectively receive the image sensing results IMG_1-IMG_N generated from the image sensors 420_1-420_N. Each of the computing units 440_1-440_N may generate a determining result by determining a shape and/or a center of the object 450, and/or by determining a relative distance, angle and moving direction between the object 350 and the image sensors. In addition, the computing unit 440_1 serving as the master receives the determining results R_2-R_N from the computing units 440_2-440_N, and the computing unit 440_1 generates an integrated determining result R_Final according to the determining results R_1-R_N, and transmits the integrated determining result R_Final to the control unit 430 to make the control unit 430 generate a corresponding control command S_command.

In addition, in the above embodiment, the light source module may comprise a plurality of light emitting units, and the control unit can control these light emitting units to illuminate the object at different times, respectively, and the image sensors sense the object at different times, respectively, to generate the image sensing results IMG_1-IMG_N.

Because the image sensor has a limited sensing range, to satisfy the demands of various applications, the image sensors of the motion detecting system of the preset invention have several possible positioning methods described as follows.

Figure 5A:
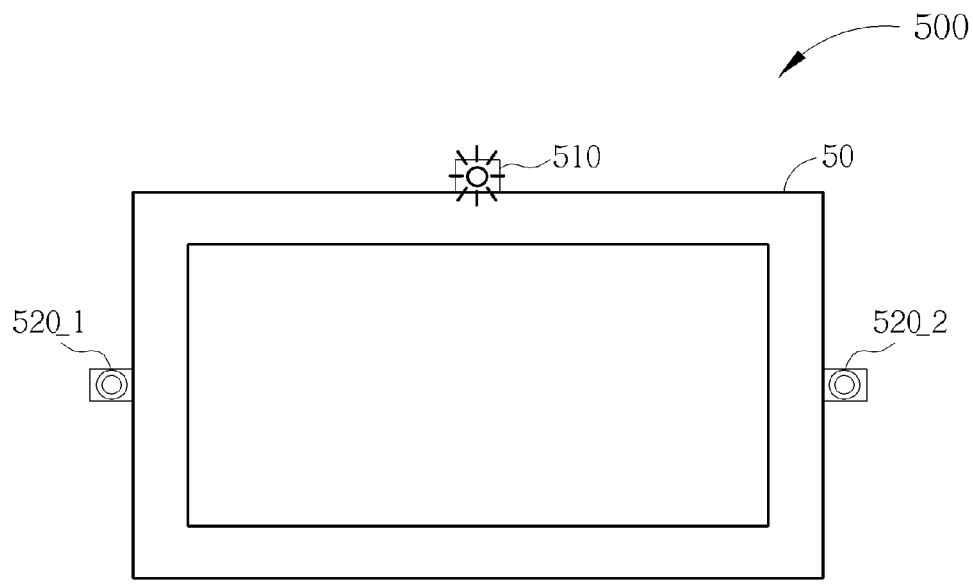
FIGS. 5A-5B are diagrams showing one position of the motion detecting systems according to some embodiments of the present invention.
Figure 5B:
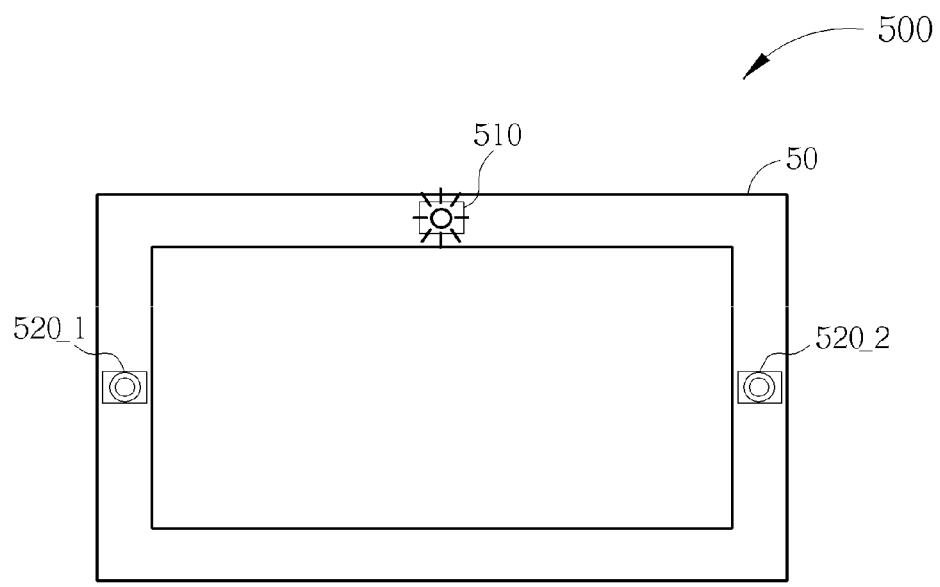

FIG. 5A and FIG. 5B are diagrams showing the positions of the motion detecting systems according to another embodiment of the present invention. As shown in FIG. 5A and FIG. 5B, the motion detecting system 500 comprises a light source module 510, image sensors 520_1-520_2 and a control unit (not shown). The image sensor 520_1 is positioned on a left side of a display device 50, and the image sensor 520_2 is positioned on a right left side of the display device 50, therefore, the horizontal sensing range of the motion detecting system 500 can be effectively increased. The difference between the embodiments shown in FIG. 5A and FIG. 5B is that: the light source module 510 and the image sensors 520_1-520_2 shown in FIG. 5B are positioned inside a housing of the display device 50, and the light source module 510 and the image sensors 520_1-520_2 shown in FIG. 5A are positioned outside the display device 50 (may be connected together or not).

Figure 6A:
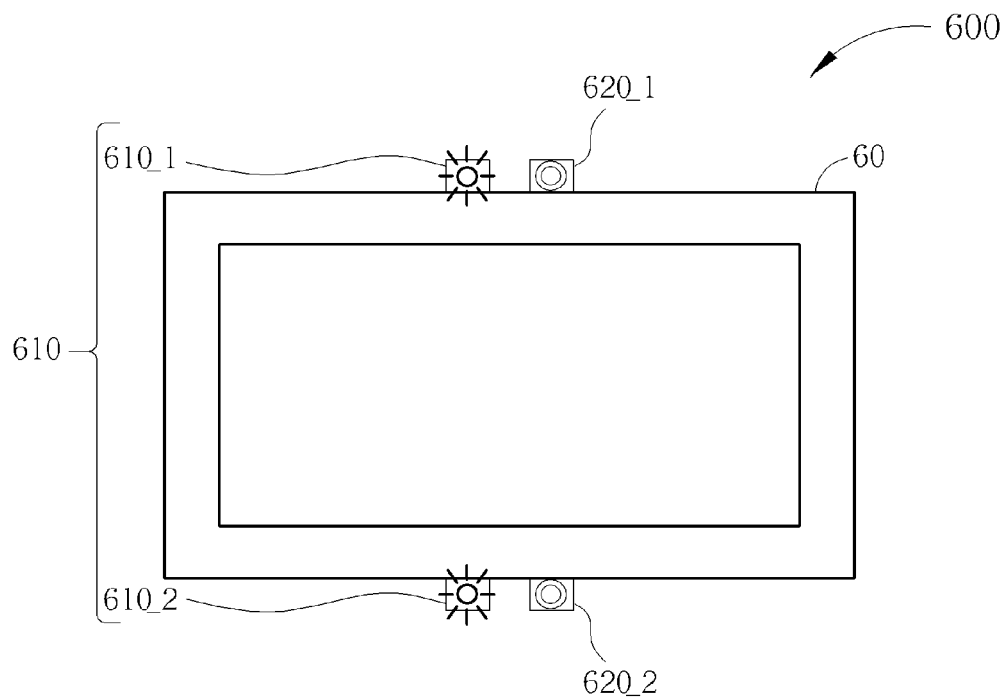
FIGS. 6A-6B are diagrams showing another position of the motion detecting systems according to some embodiments of the present invention.
Figure 6B:
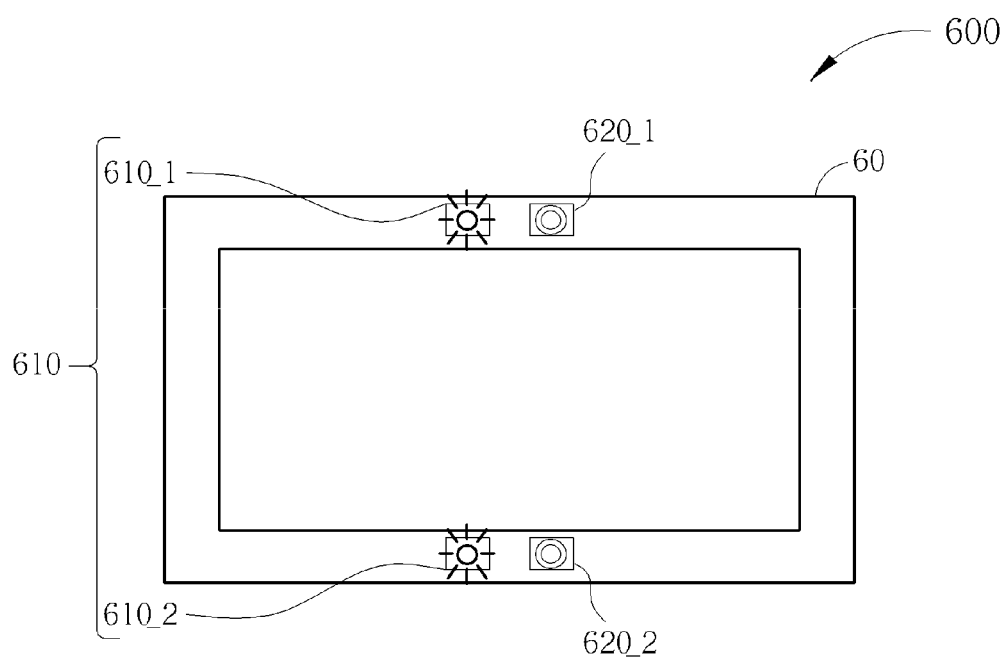

FIG. 6A and FIG. 6B are diagrams showing the positions of the motion detecting systems according to another embodiment of the present invention. As shown in FIG. 6A and FIG. 6B, the motion detecting system 600 comprises a light source module 610, image sensors 620_1-620_2 and a control unit (not shown). The light source module 610 comprises light emitting units 610_1 and 610_2. The light emitting unit 610_1 and the image sensor 620_1 are positioned on an up side of a display device 60, and the light emitting unit 610_2 and the image sensor 620_2 are positioned on a down side of the display device 60, therefore, the vertical sensing range of the motion detecting system 600 can be effectively increased. The difference between the embodiments shown in FIG. 6A and FIG. 6B is that: the light emitting units 610_1-610_2 and the image sensors 620_1-620_2 shown in FIG. 6B are positioned inside a housing of the display device 60, and the light emitting units 610_1-610_2 and the image sensors 620_1-620_2 shown in FIG. 6A are positioned outside the display device 60 (may be connected together or not).

Figure 7A:
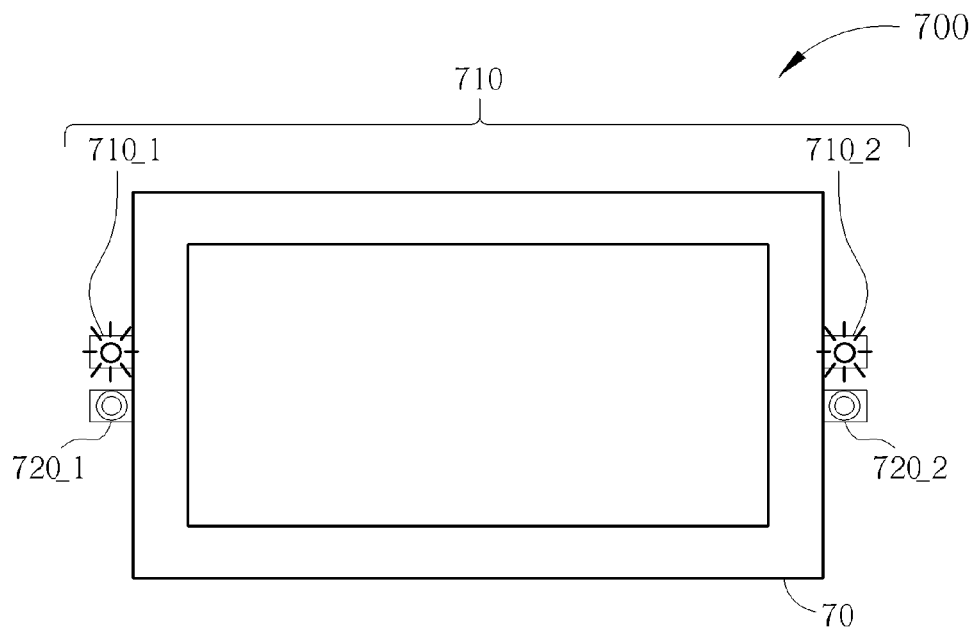
FIGS. 7A-7B are diagrams showing another position of the motion detecting systems according to some embodiments of the present invention.
Figure 7B:
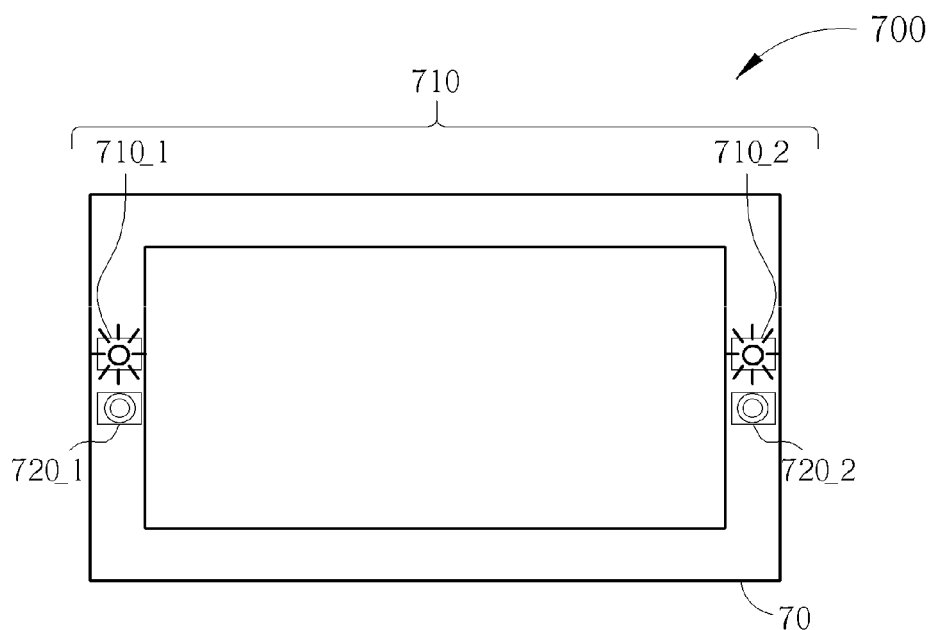

FIG. 7A and FIG. 7B are diagrams showing the positions of the motion detecting systems according to another embodiment of the present invention. As shown in FIG. 7A and FIG. 7B, the motion detecting system 700 comprises a light source module 710, image sensors 720_1-720_2 and a control unit (not shown). The light source module 710 comprises light emitting units 710_1 and 710_2. The light emitting unit 710_1 and the image sensor 720_1 are positioned on a left side of a display device 70, and the light emitting unit 710_2 and the image sensor 720_2 are positioned on a right side of the display device 70, therefore, the horizontal sensing range of the motion detecting system 700 can be effectively increased. Moreover, because the light emitting units 710_1 and 710_2 are positioned on different sides, the lighting range can be increased to improve the sensitivity of the motion detecting system 700. The difference between the embodiments shown in FIG. 7A and FIG. 7B is that: the light emitting units 710_1-710_2 and the image sensors 720_1-720_2 shown in FIG. 7B are positioned inside a housing of the display device 70, and the light emitting units 710_1-710_2 and the image sensors 720_1-720_2 shown in FIG. 7A are positioned outside the display device 70 (may be connected together or not).

Figure 8A:
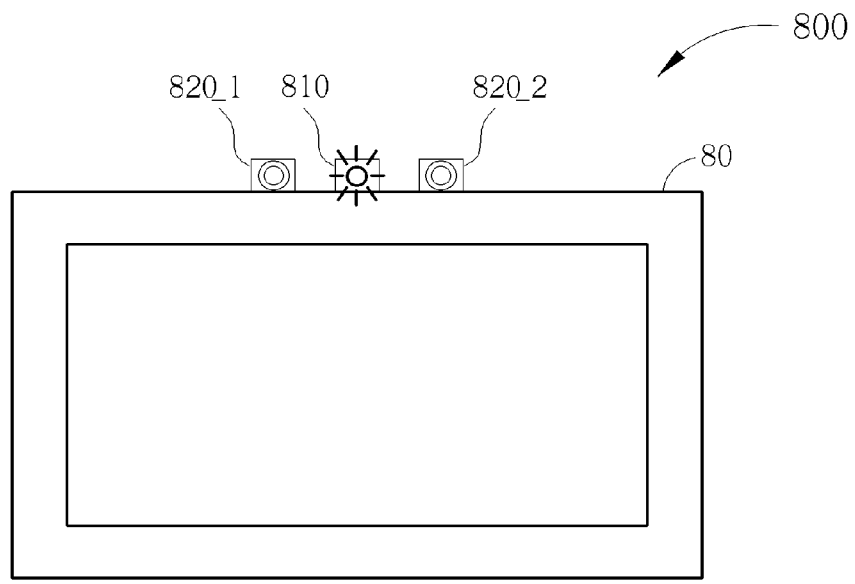
FIGS. 8A-8B are diagrams showing another position of the motion detecting systems according to some embodiments of the present invention.
Figure 8B:
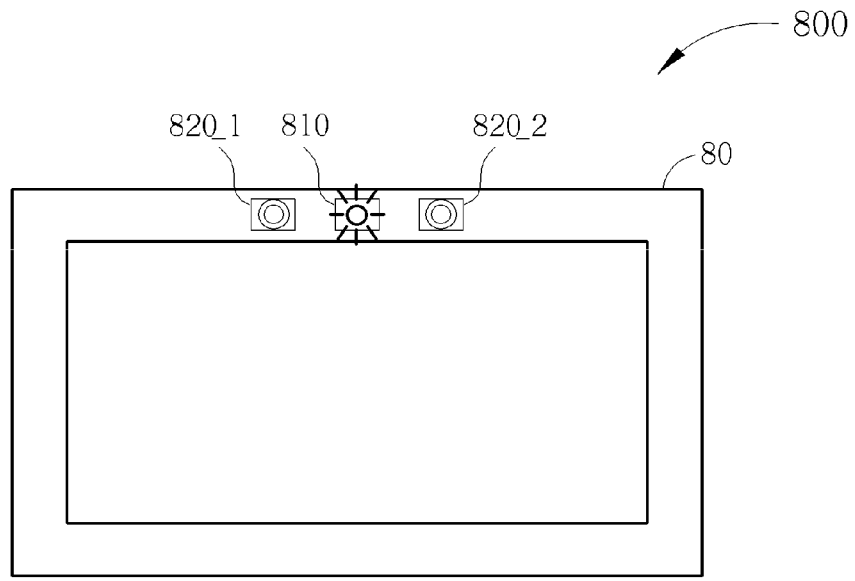

FIG. 8A and FIG. 8B are diagrams showing the positions of the motion detecting systems according to another embodiment of the present invention. As shown in FIG. 8A and FIG. 8B, the motion detecting system 800 comprises a light source module 810, image sensors 820_1-820_2 and a control unit (not shown). The light source module 810 and the image sensors 820_1-820_2 are positioned on the same side of a display device 80, and the image sensors 820_1-820_2 are positioned on two different sides of the light source module 810. Because the distance between the image sensors 820_1 and 820_2 is shorter, the image sensors 820_1 and 820_2 have an overlapping sensing range. If the image sensors 820_1 and 820_2 are simultaneously used to sense an object, three-dimension position information can be obtained. The difference between the embodiments shown in FIG. 8A and FIG. 8B is that: the light source module 810 and the image sensors 820_1-820_2 shown in FIG. 8B are positioned inside a housing of the display device 80, and the light source module 810 and the image sensors 820_1-820_2 shown in FIG. 8A are positioned outside the display device 80 (may be connected together or not).

Figure 9A:
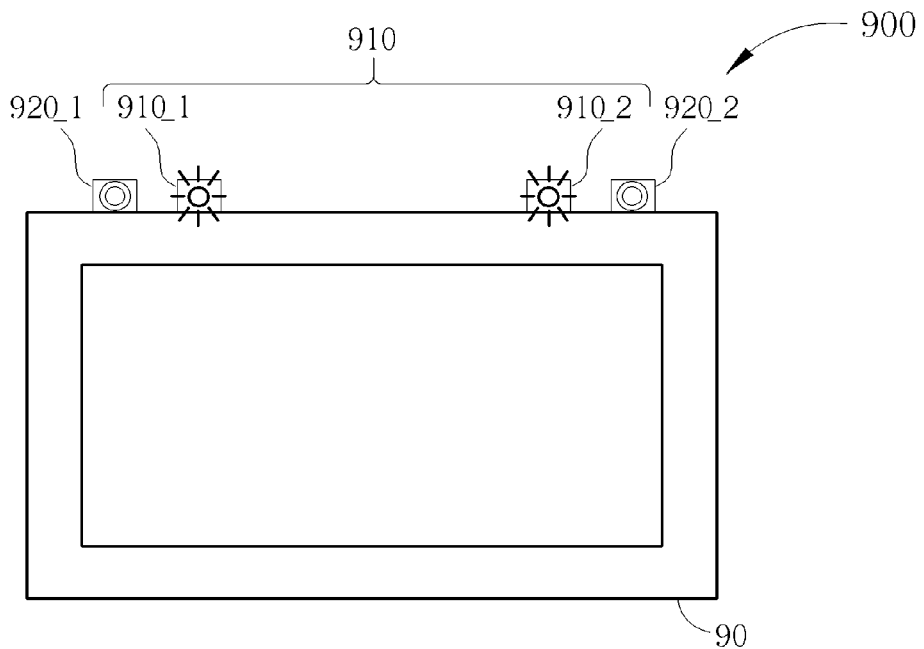
FIGS. 9A-9B are diagrams showing another position of the motion detecting systems according to some embodiments of the present invention.
Figure 9B:
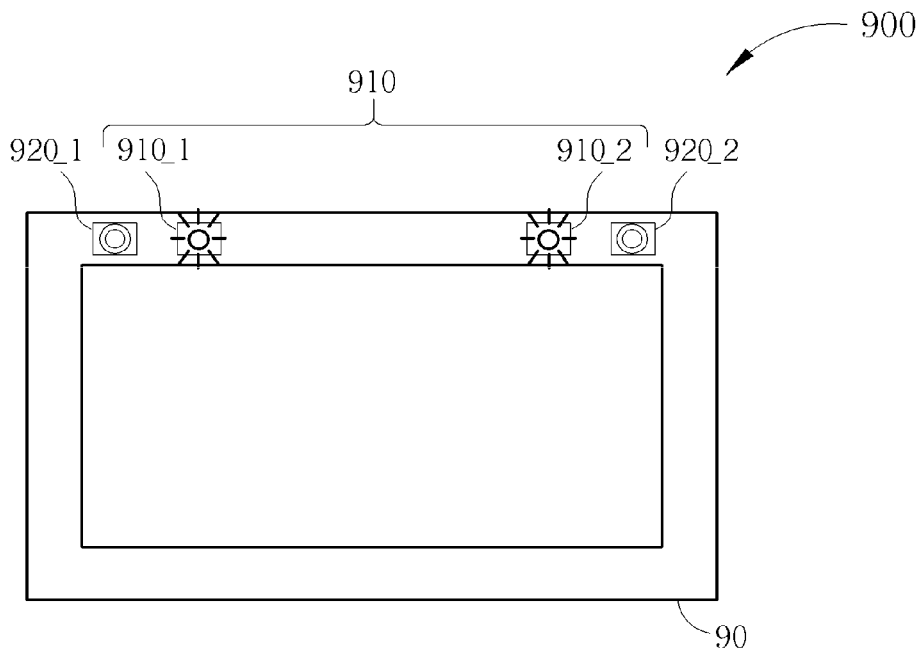

FIG. 9A and FIG. 9B are diagrams showing the positions of the motion detecting systems according to another embodiment of the present invention. As shown in FIG. 9A and FIG. 9B, the motion detecting system 900 comprises a light source module 910, image sensors 920_1-920_2 and a control unit (not shown). The light source module 910 comprises light emitting units 910_1-910_2. The light emitting units 910_1-910_2 and the image sensors 920_1-920_2 are positioned on the same side of a display device 90, the light source 910_1 and the image sensor 920_1 are positioned a relative left side of the display device 90, and the light source 910_2 and the image sensor 920_2 are positioned a relative right side of the display device 90. Because of the positions of the image sensors 920_1-920_2, three-dimension position information of an object may be obtained. In addition, because the motion detecting system 900 has more light emitting units, the sensitivity of the motion detecting system 900 is better. The difference between the embodiments shown in FIG. 9A and FIG. 9B is that: the light emitting units 910_1-910_2 and the image sensors 920_1-920_2 shown in FIG. 9B are positioned inside a housing of the display device 90, and the light emitting units 910_1-910_2 and the image sensors 920_1-920_2 shown in FIG. 9A are positioned outside the display device 90 (may be connected together or not).

Figure 10A:
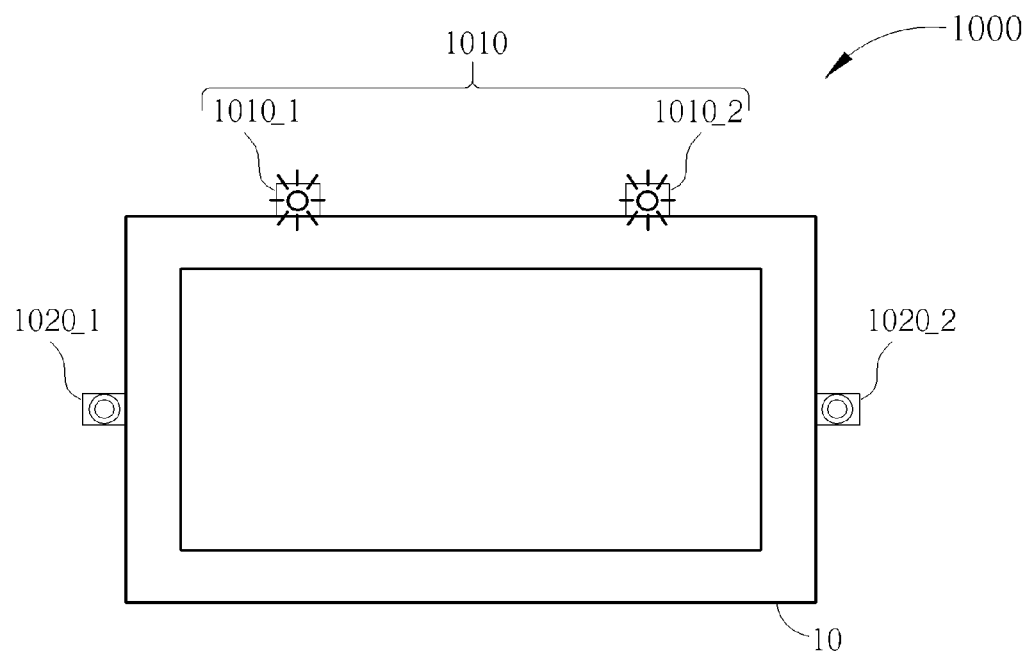
FIGS. 10A-10B are diagrams showing another position of the motion detecting systems according to some embodiments of the present invention.
Figure 10B:
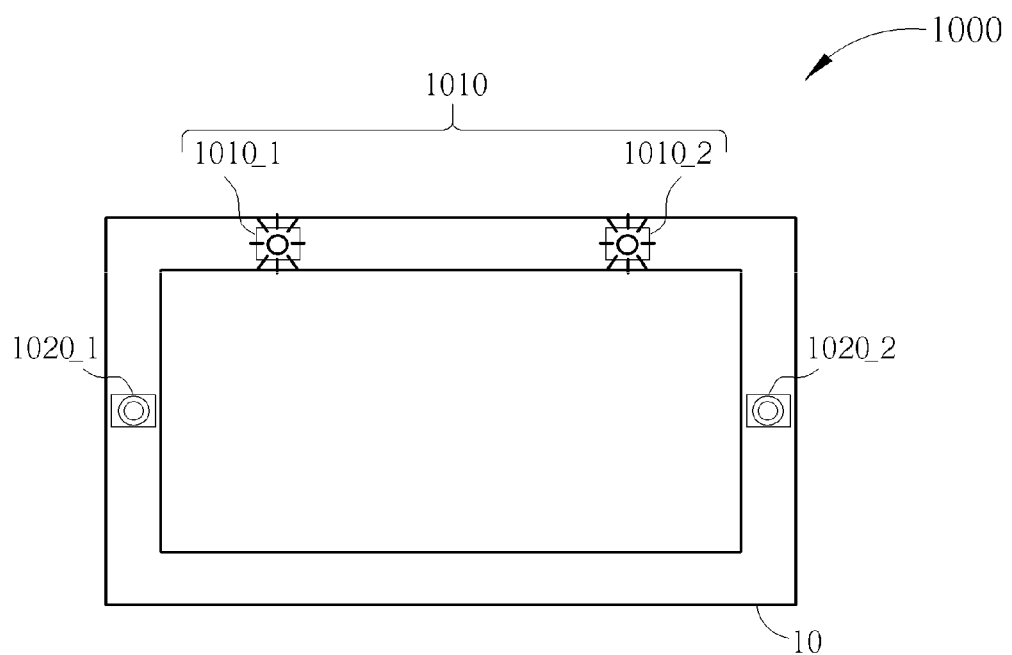

FIG. 10A and FIG. 10B are diagrams showing the positions of the motion detecting systems according to another embodiment of the present invention. As shown in FIG. 10A and FIG. 10B, the motion detecting system 1000 comprises a light source module 1010, image sensors 1020_1-1020_2 and a control unit (not shown). The light source module 1010 comprises light emitting units 1010_1-1010_2. The light emitting units 910_1-910_2 are positioned on the same side of a display device 10, and the image sensors 1020_1-1020_2 are positioned on the other two sides of the display device 10. The motion detecting system 1000 has a wider horizontal sensing range and a better sensitivity. The difference between the embodiments shown in FIG. 10A and FIG. 10B is that: the light emitting units 1010_1-1010_2 and the image sensors 1020_1-1020_2 shown in FIG. 10B are positioned inside a housing of the display device 10, and the light emitting units 1010_1-1010_2 and the image sensors 1020_1-1020_2 shown in FIG. 10A are positioned outside the display device 10 (may be connected together or not).

Figure 11A:
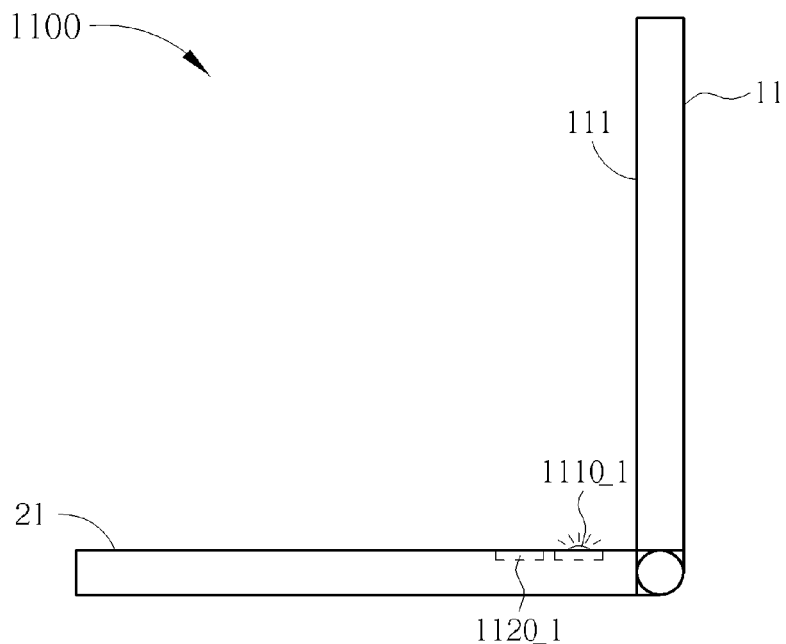
FIGS. 11A-11D are diagrams showing another position of the motion detecting systems according to some embodiments of the present invention.
Figure 11B:
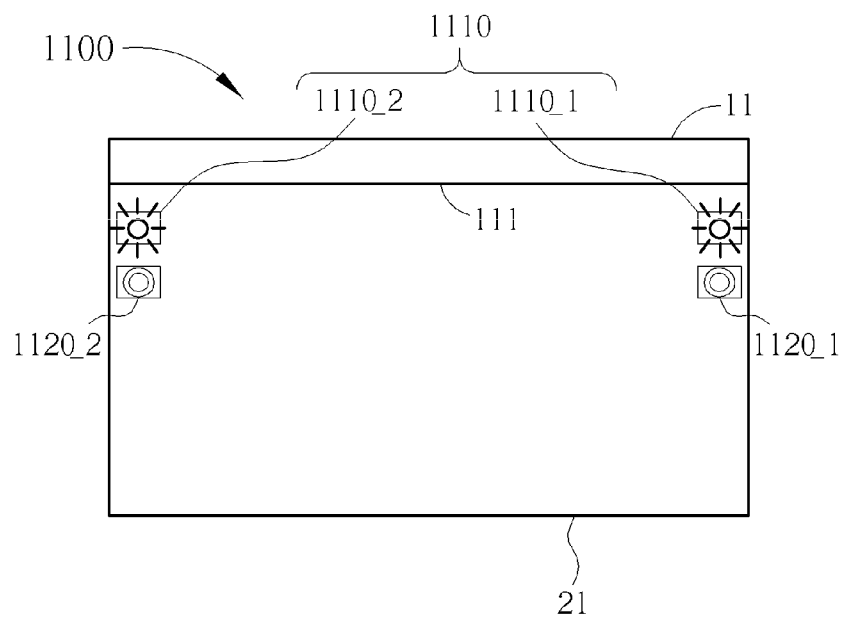
Figure 11C:
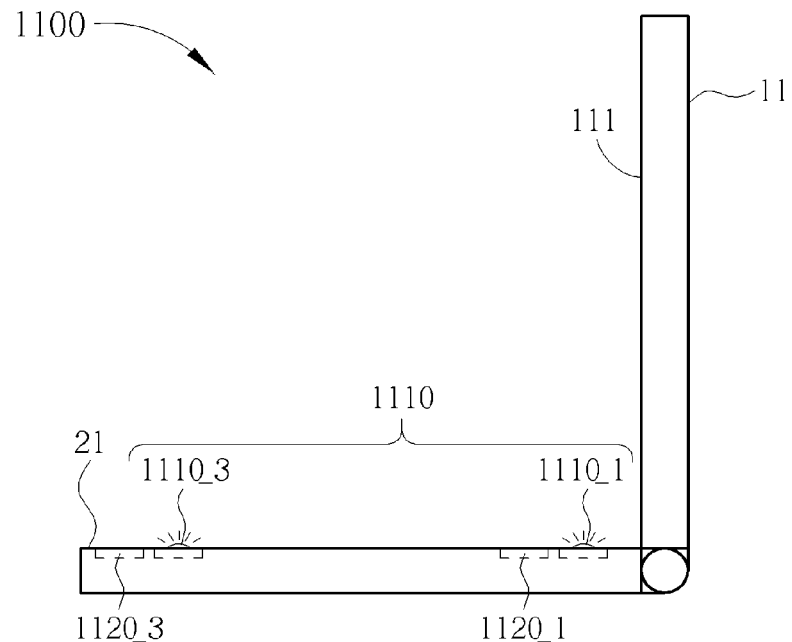
Figure 11D:
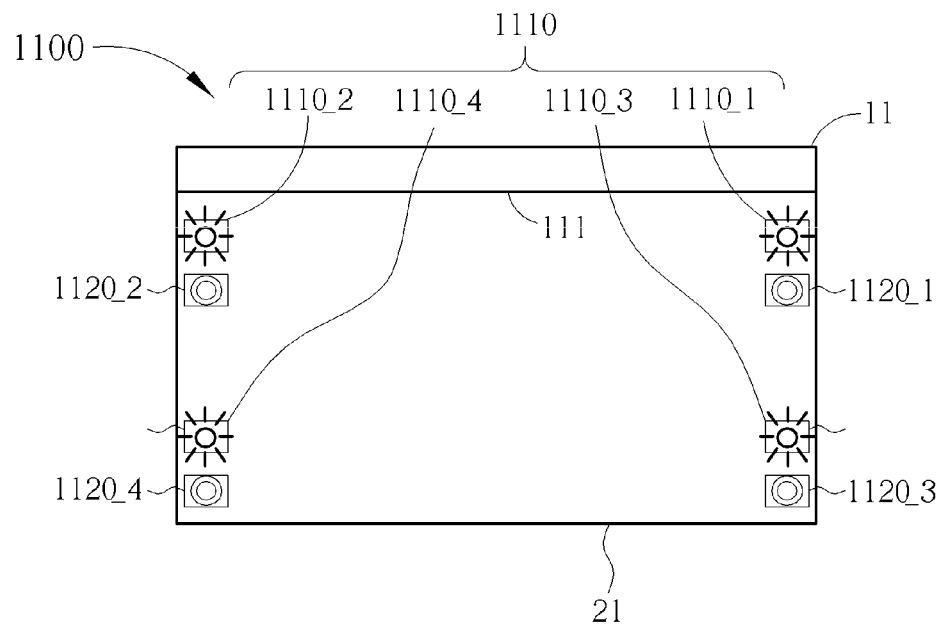

FIGS. 11A-11D are diagrams showing the positions of the motion detecting systems according to another embodiment of the present invention. Please refer to FIG. 11A and FIG. 11B first, where FIG. 11A is a side view of the embodiment, and FIG. 11B is a vertical view of the embodiment. The motion detecting system 1100 comprises a light source module 1110, image sensors 1120_1-1120_2 and a control unit (not shown). The light source module 1110 comprises light emitting units 1110_1-1110_2. The light emitting units 1110_1-1110_2 and the image sensors 1120_1-1120_2 are positioned on two sides of a front side of a display surface 111 of a display device 11. In this embodiment, because the light emitting units 1110_1-1110_2 and the image sensors 1120_1-1120_2 positioned in front of the display device 11, the sensed position information of the object is different from the previous embodiments. In addition, this embodiment also indicates that the motion detecting system of the present invention can be integrated into a notebook, where the display device 11 can be regarded as a built-in display of the notebook, and the bottom 21 can be regarded as a main body of the notebook. FIG. 11C and FIG. 11D are side view and vertical view of another embodiment. The difference between these two embodiments shown in FIG. 11A-11D is that: the embodiment shown in FIG. 11C and FIG. 11D has more image sensors 1120_3-1120_4 and more light emitting units 1110_3-1110_4, causing wider sensing range and better sensitivity.

Figure 12A:
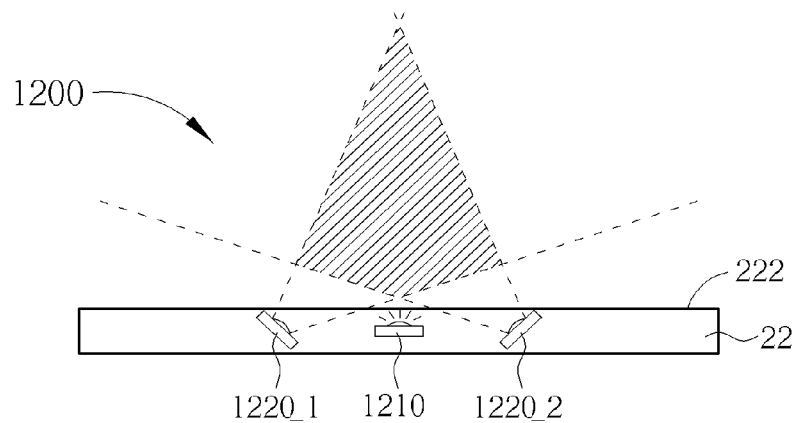
FIGS. 12A-12B are diagrams showing another position of the motion detecting systems according to some embodiments of the present invention.
Figure 12B:
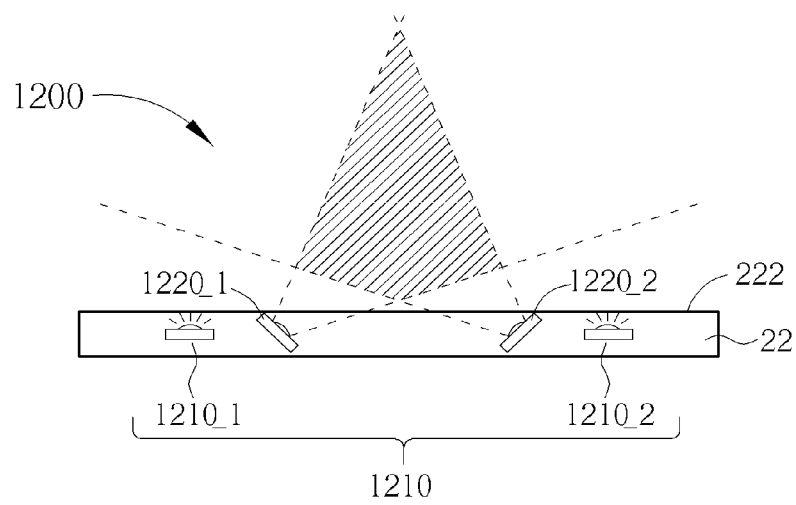

FIG. 12A and FIG. 12B are diagrams showing the positions of the motion detecting systems according to another embodiment of the present invention, where FIG. 12A and FIG. 12B is a vertical view of the motion detecting systems. The motion detecting system 1200 comprises a light source module 1210, image sensors 1220_1-1220_2 and a control unit (not shown). The image sensors 1220_1-1220_2 are positioned on a side of a display device 22 by using a non-parallel positioning method. That is, the positions of the image sensors 1220_1-1220_2 are not parallel to a display surface 222 of the display device 22. In this embodiment, because the image sensors 1220_1-1220_2 have a larger overlapping sensing range, more three-dimension information of an object can be obtained. The difference between these two embodiments shown in FIG. 12A and FIG. 12B is that: the embodiment shown in FIG. 12B has more light emitting units, and its sensitivity is better.

Figure 13A:
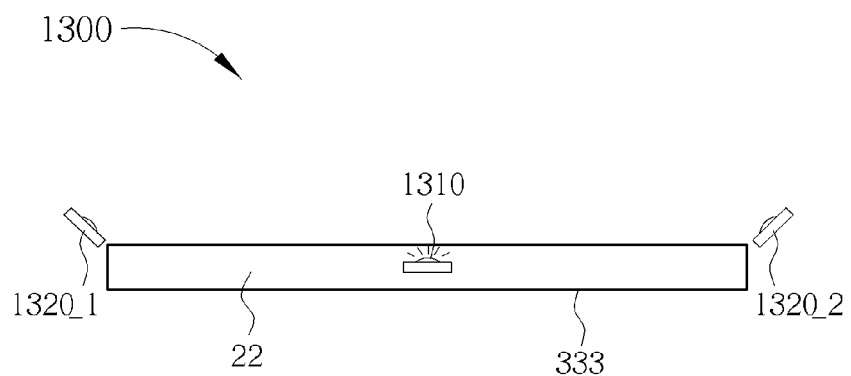
FIGS. 13A-13B are diagrams showing another position of the motion detecting systems according to some embodiments of the present invention.
Figure 13B:
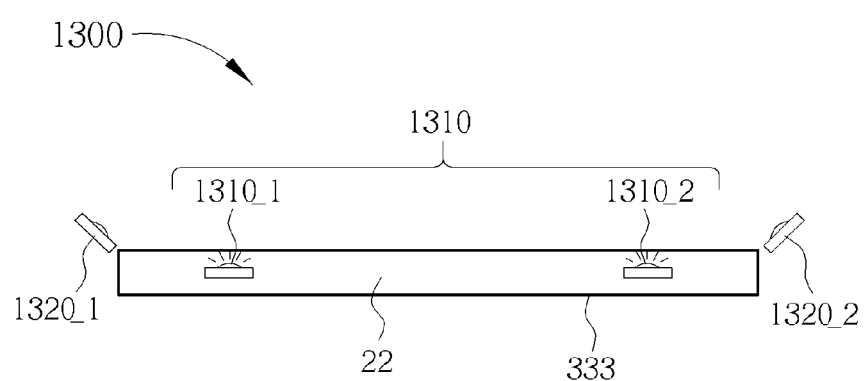

FIG. 13A and FIG. 13B are diagrams showing the positions of the motion detecting systems according to another embodiment of the present invention, where FIG. 13A and FIG. 13B is a vertical view of the motion detecting systems. The motion detecting system 1300 comprises a light source module 1310, image sensors 1320_1-1320_2 and a control unit (not shown). The image sensors 1320_1-1320_2 are positioned on a left side and a right side of a display device 33, respectively, by using a non-parallel positioning method (the image sensors 1320_1-1320_2 may be connected to an outside of the display device 33 or be built in a housing of the display device 33). That is, the positions of the image sensors 1320_1-1320_2 are not parallel to a display surface 333 of the display device 33. In this embodiment, because the image sensors 1320_1-1320_2 have a larger overlapping sensing range, more three-dimension information of an object can be obtained. The difference between these two embodiments shown in FIG. 13A and FIG. 13B is that: the embodiment shown in FIG. 13B has more light emitting units, and its sensitivity is better.

Referring to the above-mentioned embodiments, by using a non-parallel positioning method to arrange the positions of the image sensors on one side of the display device, the sensing ranges of the image sensors will have more overlapping region. However, in another embodiment, under this non-parallel positioning method, a position range of the image sensor can also be adjusted to make the sensing ranges of different image sensors are separate (i.e. not overlapped). Therefore, the image sensors may have an effective use, and the motion detecting system may have the largest sensing range. In addition, different image sensors may have different viewing angle and sensing range by using the lens design to satisfy the use's specific requirement about the sensing range. These alternative designs shall fall within the scope of the present invention.

Figure 14:
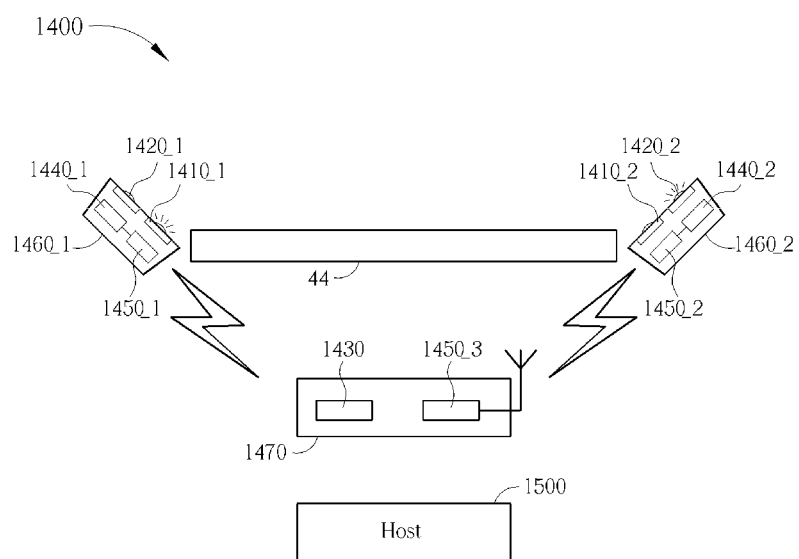
FIG. 14 is a diagram illustrating a motion detecting system having separate structure according to one embodiment of the present invention.

The motion detecting system of the present invention may also be implemented by using a separate structure. As shown in FIG. 14, the motion detecting system 1400 comprises motion detecting sub-systems 1460_1 and 1460_2, and a control sub-system 1470. The motion detecting sub-systems 1460_1 and 1460_2 comprise light emitting units 1410_1-1410_2, image sensors 1420_1-1420_2, computing units 1430_1-1430_2, wireless transmitting module 1450_1-1450_2, respectively, and the control sub-system 1470 comprises a control unit 1430 and a wireless transmitting module 1450_3. The motion detecting sub-systems 1460_1 and 1460_2 use their image sensors and computing units to generate determining results R_1 and R_2 by determining a shape and/or a center of the object, and/or by determining a relative distance, angle and moving direction between the object and the image sensors. Then, the determining results R_1 and R_2 are transmitted to the control sub-system 1470 via the wireless transmitting modules 1450_1-1450_2. The wireless transmitting module 1450_3 of the control sub-system 1470 transmits the received determining results R_1 and R_2 to the control unit 1430, and the control unit 1430 generates the control command S_command according to the determining results R_1 and R_2. Then, the control command S_command is transmitted to a host 1500 by using wire transmission or wireless transmission (via the wireless transmitting module 1450_3). In another embodiment of the present invention, the motion detecting sub-system 1460_1 may serve as a mater, and the motion detecting sub-system 1460_2 transmits its determining result R_2 to the motion detecting sub-system 1460_1 via the wireless transmitting module 1450_2. Then the computing unit 1440_1 generates an integrated determining result R_Final according to a sensing result of the image sensor 1420_1 and the determining result R_2, and the determining result R_2 is transmitted to the control sub-system 1470 via the wireless transmitting module 1450_1. The control unit 1430 generates the control command S_command according to the integrated determining result R_Final, and transmits the control command S_command to the host 1500 via wire transmission or wireless transmission. The host 1500 may start to execute an application according to the control command S_command, or the host 1500 may control the executed application according to the control command S_command, and the results of the application generated according to the control command S_command are shown on a display device 44. The above embodiment has the advantages such as the distance between different image sensors can be larger, not be limited by the length of the connecting lines, and wider sensing range.

Figure 15A:
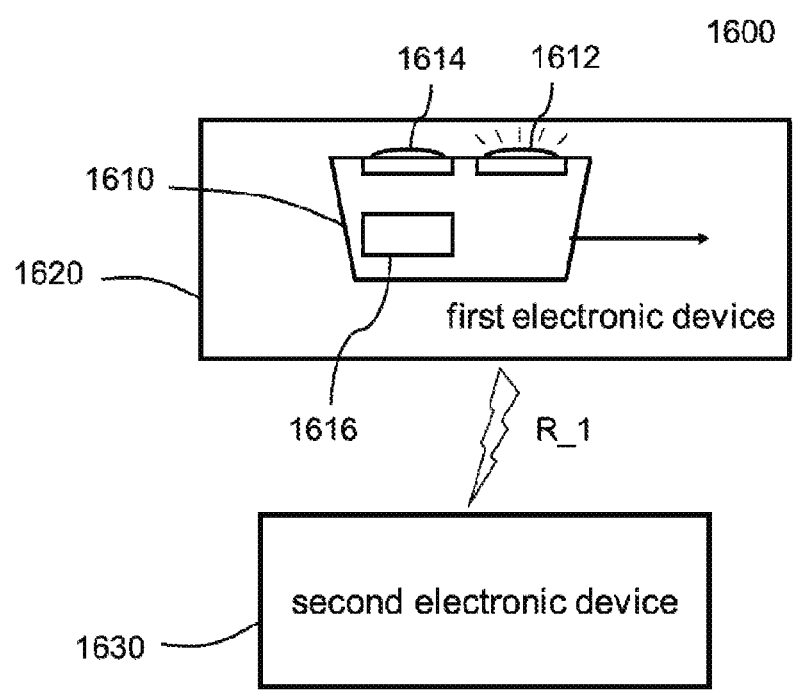
FIG. 15A-FIG. 15B are diagrams illustrating a motion detecting system according to an alternative embodiment of the present invention.

FIG. 15A is a diagram illustrating a motion detecting system according to an alternative embodiment of the present invention. Referring to FIG. 15A, the motion detecting system 1600 of this embodiment includes a first motion detecting sub-system 1610, a first electronic device 1620 and a second electronic device 1630. The first motion detecting sub-system 1610 is integrated in the first electronic device 1620. The first motion detecting sub-system 1610 includes a light emitting unit 1612, an image sensor 1614 and a computing unit 1616. The first motion detecting sub-system 1610 may generate a determining result R_1 that represents a relative distance, an angle or a moving direction between an object and the image sensor 1614 by using the image sensor 1614 and the computing unit 1616. For example, the first motion detecting sub-system 1610 may detect gesture motions of a user (e.g. leftward motion, rightward motion, forward motion, backward motion, upward motion, downward motion or specific gesture appearance) to accordingly generate a control command (e.g. the determining result R_1).

In this embodiment, the first electronic device 1620 may be a handheld electronic device or a portable electronic device, e.g. a cell phone, an electronic book, a tablet computer or other portable electronic devices without a display screen. More specifically, the determining result R_1 detected by the first motion detecting sub-system 1610 integrated on the first electronic device 1620 may be configured to control the operation mode (e.g. page flip, selection menu operation, software execution and so on) of the first electronic device 1620 as well as transmit the determining result R_1 to the second electronic device 1630 for controlling the second electronic device 1630, wherein the determining result R_1 may be transmitted to the second electronic device 1630 wirelessly. In another embodiment, the determining result R_1 may be transmitted to the second electronic device 1630 via a cable line. In this embodiment, the second electronic device 1630 may be a digital TV or other electronic devices with a display screen.

In one embodiment, the above determining result R_1 may be firstly processed by the first electronic device 1620 and then transmitted to the second electronic device 1630 so as to control or operate the state of the second electronic device 1630, e.g. switching on-screen webpages, switching TV channels, controlling volume of the second electronic device 1630. That is, the above determining result R_1 may be coordinate information of the object and the first electronic device 1620 may process the determining result R_1 so as to generate the control command for controlling the second electronic device 1630.

Figure 15B:
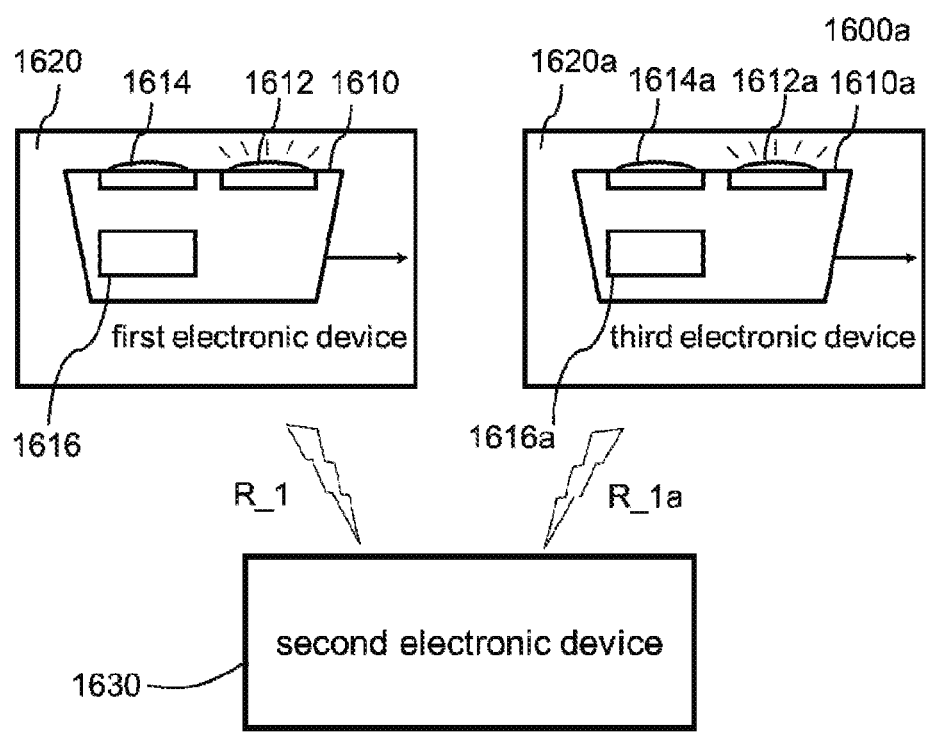

FIG. 15B is a diagram illustrating a motion detecting system according to an alternative embodiment of the present invention. Referring to FIGS. 15A and 15B, the motion detecting system 1600a of this embodiment has the same concept as the above motion detecting system 1600, and the difference therebetween is that the motion detecting system 1600a further includes at least one second motion detecting sub-system 1610a and at least one third electronic device 1620a employing the second motion detecting sub-system 1610a, wherein the second motion detecting sub-system 1610a integrated in the third electronic device 1620a includes a light emitting unit 1612a, an image sensor 1614a and a computing unit 1616a. Similarly, the second motion detecting sub-system 1610a may generate a determining result R_1a that represents a relative distance, an angle or a moving direction between an object and the image sensor 1614a by using the image sensor 1614a and the computing unit 1616a. For example, the second motion detecting sub-system 1610a may detect gesture motions of a user (e.g. leftward motion, rightward motion, forward motion, backward motion, upward motion, downward motion or specific gesture appearance) to accordingly generate a control command (e.g. the determining result R_1a).

More specifically, the motion detecting system 1600a may perform the detection or identification of the gesture or object by using the first electronic device 1620 integrated with the first motion detecting sub-system 1610 as well as perform the detection or identification of the gesture or object by using the third electronic device 1620a integrated with the second motion detecting sub-system 1610a; that is, the motion detecting system 1600a of this embodiment may be operated simultaneously by different users holding the first electronic device 1620 and the third electronic device 1620a respectively so as to be applied to multi-user control operation, e.g. used in games.

Figure 16:
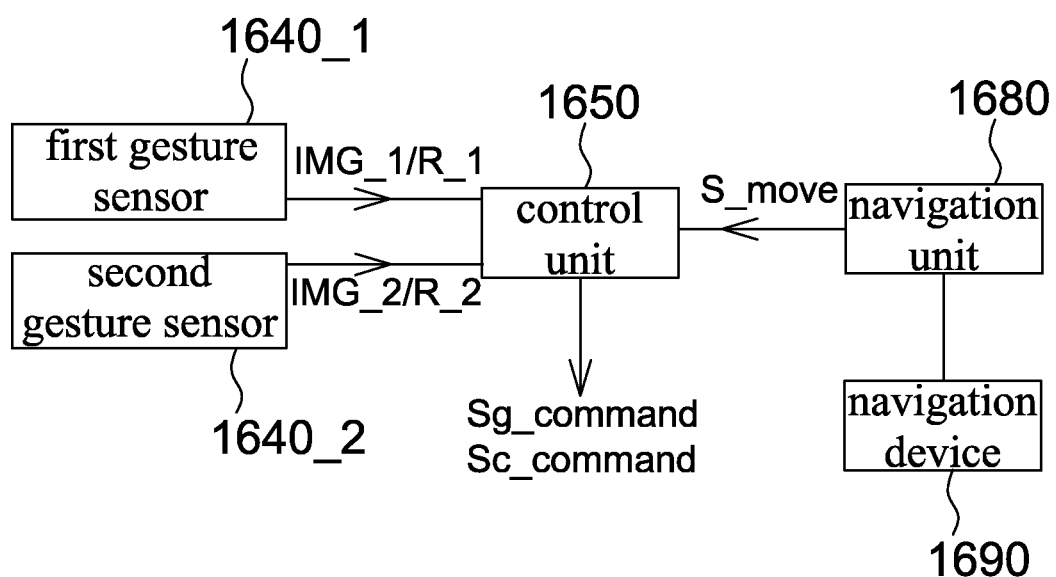
FIG. 16 is schematic block diagram of a motion detecting system according to a fifth embodiment of the present disclosure.

Referring to FIG. 16, it is schematic block diagram of a motion detecting system according to a fifth embodiment of the present disclosure. The motion detecting system 1600 includes a first gesture sensor 1640_1, a second gesture sensor 1640_2, a control unit 1650, a navigation unit 1680 and a navigation device 1690, wherein the first gesture sensor 1640_1 and the second gesture sensor 1640_2 are, for example, motion detecting sub-systems 360_1-360_N mentioned above. Sensing ranges of the first gesture sensor 1640_1 and the second gesture sensor 1640_2 are partially overlapped or not overlapped with each other thereby increasing an operation range of the motion detecting system 1600.

It should be mentioned that although FIG. 16 shows that the motion detecting system 1600 includes the first gesture sensor 1640_1, the second gesture sensor 1640_2, the control unit 1650, the navigation unit 1680 and the navigation device 1690 at the same time, it is only intended to illustrate but not to limit the present disclosure. For example in some embodiments, the motion detecting system 1600 includes the first gesture sensor 1640_1, the second gesture sensor 1640_2 and the control unit 1650 but does not include the navigation unit 1680 and the navigation device 1690. For example in some embodiments, the motion detecting system 1600 includes the first gesture sensor 1640_1, the control unit 1650, the navigation unit 1680 and the navigation device 1690 but does not include the second gesture sensor 1640_2.

More specifically, the motion detecting system 1600 includes a plurality of gesture sensors to detect different gestures corresponding to different controls. Or, the motion detecting system 1600 includes at least one gesture sensor working in cooperation with a navigation device to respectively detect a gesture and a navigation displacement, wherein the detected gesture and navigation displacement are used to perform different controls or both used to control the cursor motion.

The control unit 1650 is electrically coupled to the first gesture sensor 1640_1, the second gesture sensor 1640_2 and the navigation unit 1680, and post-processes detection signals transmitted therefrom to generate control command. In this embodiment, the control unit 1650 outputs a gesture control command Sg_command corresponding to the detection signals (e.g. image data) of the first gesture sensor 1640_1 and/or the second gesture sensor 1640_2, and outputs a cursor control command Sc_command corresponding to the detection signals (e.g. displacement) of the navigation unit 1680.

In addition, as mentioned above the control unit 1650 is directly coupled to an image sensor or coupled to the image sensor via a computing unit. For illustration purposes, the gesture sensor in this embodiment (e.g. the first gesture sensor 1640_1 and the second gesture sensor 1640_2) includes (i) an image sensor, (ii) an image sensor and a computing unit or (iii) an image sensor, a computing unit and a light emitting unit. In other words, in some embodiments the computing unit is a digital signal processor (DSP) and included, together with an image sensor, in a gesture sensor; in some embodiments, the computing unit is a microprocessor (MCU) and disposed in the control unit 1650 (e.g. the computing unit 240 shown in FIG. 1 is included in the control unit 230).

The navigation unit 1680 is, for example, a digital signal processor (DSP) or an application specific integrated circuit (ASIC) and is disposed in the navigation device 1690, wherein the navigation device 1690 is, for example, a mouse device, a finger mouse or other devices capable of detecting relative motion with respect to an operating surface or a finger surface. The navigation unit 1680 is coupled to the control unit 1650 in a wired or wireless manner for communicating data therebetween.

As mentioned above, it is possible for the first gesture sensor 1640_1 and the second gesture sensor 1640_2 to output image sensing results IMG_1, IMG_2 or determining results R_1, R_2. For illustration purposes, the first gesture sensor 1640_1 and the second gesture sensor 1640_2 are illustrated by outputting image data, and the image data is the image sensing results IMG_1, IMG_2 or the determining results R_1, R_2 depending on whether the computing unit is included in the gesture sensor or not.

The first gesture sensor 1640_1 is configured to output first image data IMG_1/R_1, the second gesture sensor 1640_2 is configured to output second image data IMG_2/R_2, and the navigation unit 1680 is configured to calculate a displacement S_move, wherein the method of generating the first image data IMG_1/R_1 and the second image data IMG_2/R_2 has been illustrated above and thus details thereof are not repeated herein. The navigation unit 1680 is configured to calculate the displacement S_move by comparing two image frames outputted by a sensor array (e.g., included in the navigation device 1690). For example, the navigation unit 1680 obtains the displacement S_move by calculating a correlation between two image frames.

Figure 17:
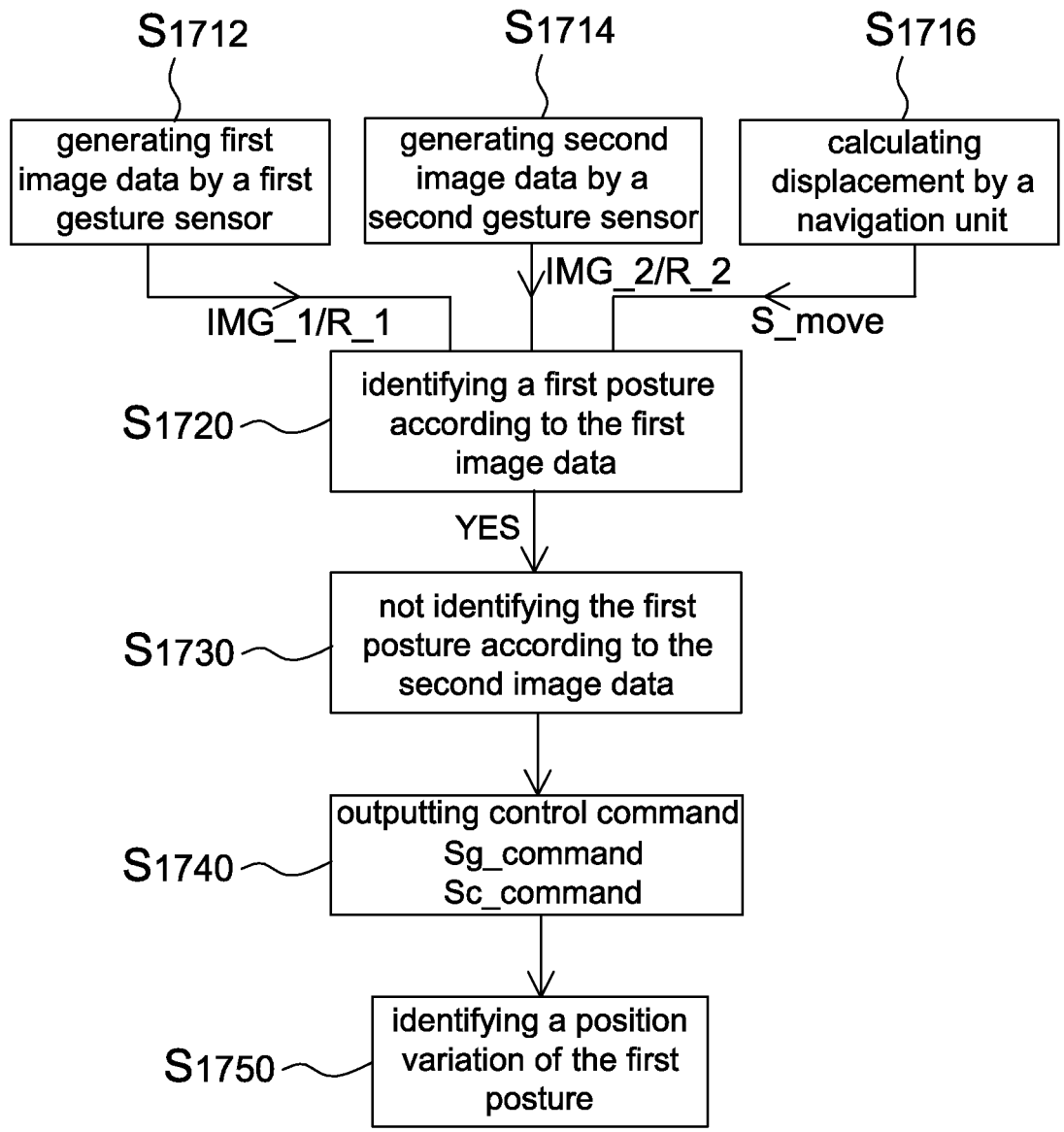
FIG. 17 is a flow chart of an operating method of a motion detecting system of the fifth embodiment of the present disclosure.

Referring to FIG. 17, it is a flow chart of an operating method of a motion detecting system 1600 of the fifth embodiment of the present disclosure. It should be mentioned that although FIG. 17 shows operations of the first gesture sensor 1640_1, the second gesture sensor 1640_2 and the navigation unit 1680, as mentioned above the motion detecting system 1600 does not necessary include all the first gesture sensor 1640_1, the second gesture sensor 1640_2 and the navigation unit 1680, the operations of the first gesture sensor 1640_1, the second gesture sensor 1640_2 and the navigation unit 1680 are not necessary to be performed at the same time (illustrated by examples hereinafter).

In one aspect, the motion detecting system 1600 includes the first gesture sensor 1640_1, the second gesture sensor 1640_2 and the control unit 1650 but does not include the navigation unit 1680 and the navigation device 1690.

The first gesture sensor 1640_1 generates the first image data IMG_1/R_1 at, for example, a first sampling rate (Step S1712), and the second gesture sensor 1640_2 generates the second image data IMG_2/R_2 at, for example, a second sampling rate (Step S1714), wherein the first sampling rate and the second sampling rate are identical to or different from each other according to different applications.

Next, the control unit 1650 receives the first image data IMG_1/R_1 and the second image data IMG_2/R_2. When the control unit 1650 identifies a first posture according to the first image data IMG_1/R_1, the control unit 1650 does not identify the first posture according to the second image data IMG_2/R_2 (Step S1720-S1730), wherein the first posture includes postures, for example, of a fist, different numbers of stretched finger(s) and a palm (i.e. five stretched fingers). In some embodiments, the control unit 1650 identifies postures of different hands respectfully according to the first image data IMG_1/R_1 and the second image data IMG_2/R_2, e.g., identifying a left hand posture according to the first image data IMG_1/R_1 and identifying a right hand posture according to the second image data IMG_2/R_2, or vice versa. Said not identifying the first posture according to the second image data IMG_2/R_2 is referred to, for example, ignoring an identified result or not sending a control command when the control unit 1650 identifies the first posture according to the second image data IMG_2/R_2, or referred to the information of the first posture stored in a storage unit being temporarily ignored such that the control unit 1650 is not able to identify the first posture according to the second image data IMG_2/R_2.

The motion detecting system 1600 includes, for example, a storage unit (e.g., a memory or a buffer) configured to previously store information related to different postures so as to be compared with currently captured image data by the control unit 1650.

When the first posture is identified according to the first image data IMG_1/R_1, the control unit 1650 is configured to output a gesture control command Sg_command of a first mode corresponding to the first posture (Step S1740) and sends the gesture control command Sg_command to an external electronic device, wherein the electronic device includes a display for showing a cursor and applications. The control unit 1650 is further configured to output another gesture control command of a second mode corresponding to a second postured according to the second image data IMG_2/R_2. As mentioned above, as the second posture is different from the first posture, the second mode does not include the first mode associated with the first image data IMG_1/R_1. For example, when the first mode is a cursor control mode, the second mode includes at least one of a zooming mode, a scrolling mode, a paging mode and a click mode but does not include the cursor control mode. Different modes respectively correspond to different postures and displacement of the postures thereby performing different controls.

In some embodiments, the first mode is a cursor control mode, a zooming mode, a scrolling mode, a paging mode or a click mode, wherein, for example, the cursor control mode is for controlling a cursor motion; the zooming mode is for controlling a zoom-in or zoom-out of a display area; the scrolling mode is for scrolling a display area; the paging mode is for turning a display screen to a next/previous page; the click mode is for selecting an application, but not limited thereto. It is possible to arrange the above modes to perform different functions without particular limitations.

After the control unit 1650 identifies the first posture according to the first image data IMG_1/R_1, a position variation (including magnitude variation and direction variation) of the first posture are identified so as to form a complete gesture control. In other words, when the first posture is recognized, the gesture control command Sg_command indicates an associated operating mode being entered and the following displacement (including magnitude and direction) is used to perform the control of the operating mode. For example, after the control unit 1650 identifies a first posture, a displacement of the first posture is identified to be served as a zoom-in or zoom-out gesture. For example, after the control unit 1650 identifies a one-finger posture (single stretched finger), a displacement of the one-finger posture is identified to be served as a cursor control gesture. For example, after the control unit 1650 identifies a three-finger posture (three stretched fingers), a displacement of the three-finger posture is identified to be served as a scrolling gesture.

The present aspect is to control different operating modes according to the image data outputted by different gesture sensors. When a predetermined posture is identified by the control unit 1650 according to the image data outputted by one of the gesture sensors, the control unit 1650 does not identify the same posture according to the image data outputted by the other gesture sensors for a predetermined time interval.

In another aspect, the motion detecting system 1600 includes the first gesture sensor 1640_1, the second gesture sensor 1640_2, the control unit 1650, the navigation unit 1680 and the navigation device 1690.

In this aspect, the operation and control of the control unit 1650 according to the image data outputted by the first gesture sensor 1640_1 and the second gesture sensor 1640_2 are illustrated above, and thus details thereof are not repeated herein. For example, in this aspect the Steps S1712, S1714, S1720, S1730 and S1750 are identical to the previous aspect. In this aspect, the navigation unit 1680 is configured to calculate a displacement S_move to be sent to the control unit 1650. The control unit 1650 is further configured to output a cursor control command Sc_command for controlling a cursor movement according to the displacement S_move. In other words, in the step S1740 of FIG. 17, the control command includes a cursor control command Sc_command and a gesture control command Sg_command. In this aspect, two gesture sensors operate in cooperation with a navigation device for performing different controls.

In one embodiment, the cursor control command Sc_command is used to control the cursor movement, but the gesture control command Sg_command is not used to control the cursor movement, i.e. the first mode is not a cursor control mode. In this case, the control unit 1650 outputs one or two gesture control commands according to the first image data IMG_1/R_1 and the second image data IMG_2/R_2.

In another embodiment, the cursor control command Sc_command and the gesture control command Sg_command are both used to control the cursor movement, e.g., the gesture control command Sg_command for large movement control whereas the cursor control command Sc_command for small movement control so as to improve the user experience. For example, a dots per inch value associated with the cursor control mode of the gesture control command Sg_command is selected to be larger than that associated with the cursor control command Sc_command.

In another aspect, the motion detecting system 1600 includes the first gesture sensor 1640_1, the control unit 1650, the navigation unit 1680 and the navigation device 1690 but does not include the second gesture sensor 1640_2.

In this aspect, the first gesture sensor 1640_1 outputs the first image data IMG_1/R_1 to the control unit 1650 and the navigation unit 1680 outputs the displacement S_move to the control unit 1650. The control unit 1650 is configured to output a cursor control command Sc_command for controlling a cursor movement and outputs a gesture control command Sg_command corresponding to a first mode according to the first image data IMG_1/R_1. In this aspect, one gesture sensor operates in cooperation with a navigation device for performing different controls.

In one embodiment, the first mode does not include a cursor control mode such that the cursor control command Sc_command is for controlling a cursor movement whereas the gesture control command Sg_command is for controlling the zooming, scrolling, paging or click without controlling the cursor.

In another embodiment, the control unit 1650 outputs a gesture control command Sg_command corresponding to a cursor control mode according to the first image data IMG_1/R_1. Therefore, the cursor control command Sc_command and the gesture control command Sg_command are both for controlling the cursor movement. As mentioned above, the cursor control command Sc_command and the gesture control command Sg_command are configured to perform the control of different moving ranges. In FIG. 17, the operating method of this aspect does not include the steps associated with the second gesture sensor 1640_2, e.g. the Steps S1714 and S1730 are not implemented.

It is noted that the term "one embodiment" mentioned above represents a particular feature, structure, or characteristic described for the embodiment are included in at least one implementation of the present invention. Furthermore, the term "one embodiment" appears in different paragraphs represents a different embodiment. Therefore, although different structural features or methods are described for the different embodiments described above, but it should be noted that these different characteristics may be implemented on the same specific embodiment through appropriate modifications.

Briefly summarized, the motion detecting system of the present invention may increase the effective sensing range and sensitivity by using more image sensors and lighting units, and therefore the efficiency of the motion detecting system is enhanced. In addition, by using the above-mentioned positioning method of the embodiments, each of the image sensors may have its most effective use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion detecting system, comprising:
   a first gesture sensor configured to sense reflecting light of a first hand to calculate an object motion of the first hand;
   a second gesture sensor configured to sense reflecting light of a second hand to generate second image data;
   a navigation device configured to calculate a displacement with respect to a surface; and
   a control unit, coupled to the first gesture sensor, the navigation device and the second gesture sensor, the control unit configured to
      output a cursor control command for controlling a cursor movement according to the displacement calculated by the navigation device, and
      control the cursor movement according to the object motion,
      wherein dots of the cursor movement per inch object motion of the first hand calculated by the first gesture sensor are larger than dots of the cursor movement per inch displacement calculated by the navigation device, and
      the second image data outputted by the second gesture sensor is not configured to control the cursor movement.

2. The motion detecting system of claim 1, wherein the control unit is further configured to receive a first posture of the first hand from the first gesture sensor.

3. The motion detecting system of claim 2, wherein the control unit is further configured to identify a second posture, which is different from the first posture, of the second hand according to the second image data.

4. The motion detecting system of claim 3, wherein the control unit is further configured to output a gesture control command according to the second posture configured to control zooming, scrolling, paging or clicking.

5. The motion detecting system of claim 3, wherein the control unit is further configured to ignore the first posture of the second hand in identifying the second posture according to the second image data.

6. The motion detecting system of claim 5, wherein the control unit is configured to ignore the first posture of the second hand for a predetermined time interval.

7. The motion detecting system of claim 1, wherein sensing ranges of the first gesture sensor and the second gesture sensor are partially overlapped or not overlapped with each other.

8. The motion detecting system of claim 1, wherein sampling rates of the first gesture sensor and the second gesture sensor are different from each other.

9. A motion detecting system, comprising:
   a gesture sensor configured to sense reflecting light of a hand to calculate an object motion of the hand;
   a mouse device configured to calculate a displacement with respect to a surface; and
   a control unit, coupled to the gesture sensor and the mouse device, the control unit configured to
      output a cursor control command for controlling a cursor movement according to the displacement calculated by the mouse device, and
      control the cursor movement according to the object motion,
      wherein dots of the cursor movement per inch object motion of the hand calculated by the gesture sensor are larger than dots of the cursor movement per inch displacement calculated by the mouse device.

10. The motion detecting system of claim 9, wherein the control unit is further configured to output a gesture control command according to a posture of the hand received from the gesture sensor.

11. The motion detecting system of claim 10, wherein the gesture control command is configured to control zooming, scrolling, paging or clicking.

12. The motion detecting system of claim 9, wherein the gesture sensor is arranged in a handheld electronic device or a portable electronic device.

13. A motion detecting system, comprising:
   an image sensor configured to sense reflecting light of an object to calculate an object motion of the object;
   a navigation device configured to calculate a displacement with respect to a surface; and
   a control unit, coupled to the image sensor and the navigation device, the control unit configured to
      output a cursor control command for controlling a cursor movement according to the displacement calculated by the navigation device, and
      control the cursor movement according to the object motion,
      wherein dots of the cursor movement per inch object motion of the object calculated by the image sensor are larger than dots of the cursor movement per inch displacement calculated by the navigation device.

14. The motion detecting system of claim 12, wherein the image sensor is arranged in a handheld electronic device or a portable electronic device.

* * * * *